United States Patent [19]

Mizusaki

[11] 4,363,240
[45] Dec. 14, 1982

[54] LIQUID-LEVEL INDICATING WINDOW

[75] Inventor: Yoshinobu Mizusaki, Ueda, Japan

[73] Assignee: Nissin Kogyo Co., Ltd., Naganoken, Japan

[21] Appl. No.: 192,019

[22] Filed: Sep. 29, 1980

[30] Foreign Application Priority Data

Sep. 29, 1979 [JP] Japan .............................. 54-135473[U]

[51] Int. Cl.³ .............................................. G01F 23/02
[52] U.S. Cl. ...................................... 73/334; 116/227;
220/82 R; 220/307; 220/DIG. 19
[58] Field of Search ........................... 116/227; 73/327;
220/307, 82 R

[56] References Cited

U.S. PATENT DOCUMENTS

| 331,023 | 11/1885 | Barrett | 220/DIG. 19 |
|---|---|---|---|
| 1,883,971 | 10/1932 | Kryzanowsky | 73/327 |
| 2,943,530 | 7/1960 | Nagel | 73/327 X |
| 3,096,648 | 7/1963 | Dombeck et al. | 73/327 X |
| 3,217,923 | 11/1965 | Price | 73/334 |
| 3,273,267 | 9/1966 | Willman | 73/327 X |
| 3,345,870 | 10/1967 | Yoshinaga | 73/327 |
| 3,385,110 | 5/1968 | Atwood et al. | 73/327 |
| 3,417,614 | 12/1968 | Ryder | 73/327 |
| 3,447,375 | 6/1969 | Fox, Jr. | 73/327 |
| 3,518,962 | 7/1970 | De Leu et al. | 73/334 X |
| 3,568,628 | 3/1971 | Erickson | 73/327 X |
| 4,133,287 | 1/1979 | Downs | 116/227 |

FOREIGN PATENT DOCUMENTS 679269  2/1964  Canada .............................. 73/334

Primary Examiner—Daniel M. Yasich
Attorney, Agent, or Firm—Birch, Stewart, Kolasch & Birch

[57] ABSTRACT

The present invention is directed to liquid-level indicating windows, especially suitable for reservoirs for master cylinder, which are characterized in that a container for housing a liquid is provided with a hole bored therein to which the liquid-level indicating window is made fit. The body of the liquid level device projects outside the container and the liquid-level indicating window has on its inside wall, at the liquid-level indicating section, a sign portion which is different from the other portions of the liquid-level indicating section in the light-path length and which is made of a material almost the same in refractive index as the liquid to be contained in the container.

12 Claims, 6 Drawing Figures

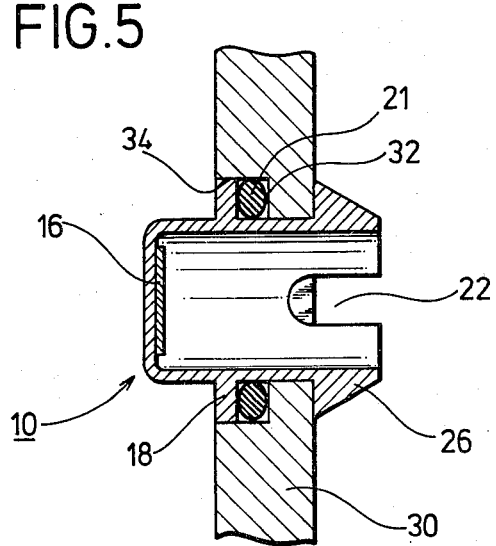
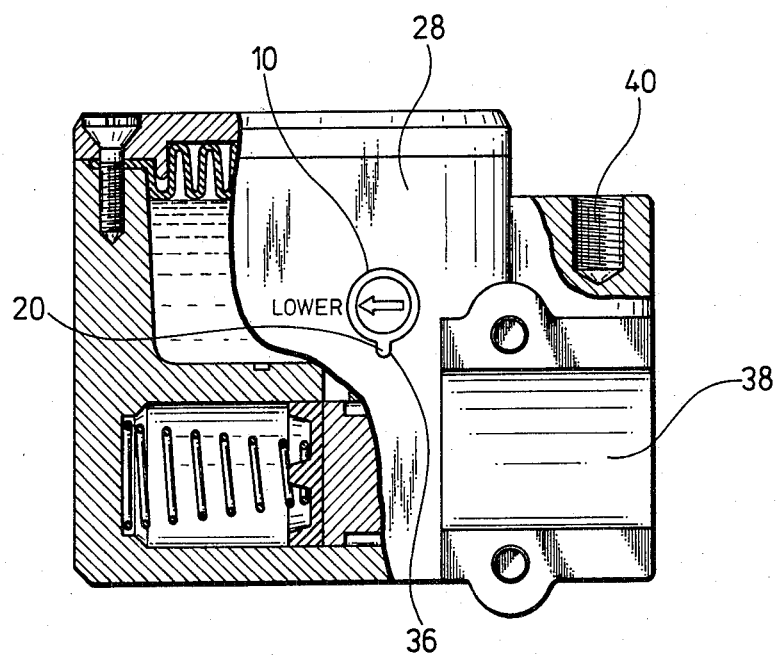

LIQUID-LEVEL INDICATING WINDOW

BACKGROUND OF THE INVENTION

1. Field of the Invention

The present invention relates to liquid-level indicating windows.

A liquid-level indicating window for checking the liquid level is provided on a liquid container made of completely opaque material such as a metal or one made of an opaque or translucent synthetic resin, e.g., a reservoir tank for a car. For the brake fluid to be replenished properly, it is necessary that the lowering of the liquid level inside the reservoir tank or the current position of the liquid surface should be known exactly, simply through visual inspection.

2. Description of the Prior Art

The technical requirements imposed on liquid-level indicating windows include no liquid leakage at any time; easy attachment on the liquid container; sufficient resistance against vibration or shock; easy check of the window even while running; and no functional damage caused by mischiefs played while parking. In addition, the structure should be such that no breakage should be caused by high impact due to the occurrence of an accident. The liquid-level indicating windows of the prior art has had to be of a large size since the inside of the reservoir tank is usually dark or the reservoir tank is provided with a complete light-screening cover. With liquid-level indicating windows of large size, however, the light refraction at the surface of the liquid-level indicating window causes the lower level of the liquid to be observed only with great difficulty. Moreover, the reservoir for the master cylinder is usually too small to be equipped with a large-sized window. It is possible to substitute two liquid-level indicating windows of ordinary size for a large-sized window, but only with increased cost.

SUMMARY OF THE INVENTION

The present invention relates to liquid-level indicating windows which are attached to a container proper for use to facilitate checking the liquid level in the container. The windows are of a small size and thus make lowering of the cost possible, and especially suitable for oil level windows for the master cylinder to two-wheel vehicles.

The purpose of the present invention is to offer such liquid level indicating windows to considerably facilitate the checking of the liquid level within a container and are easily attachable to the liquid container. The liquid-level indicating windows are disposed in a hole bored in the side wall of the container and project from the side wall surface of the container. The liquid-level indicating window has on its inside wall at the liquid-level indicating section a sign portion which is different from the other portions of the liquid-level indicating section with respect to the length of the light path.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 5 shows, with a partial cross-section, the state of the liquid-level indicating window attached to a liquid container; and FIG. 6 is a front view, with partial cross-sections, of a reservoir tank with a master cylinder attached thereto.

DETAILED DESCRIPTION OF THE INVENTION

The present invention will now be defined with reference to the drawings which are provided as being merely exemplary of the present invention.

Figure 1:
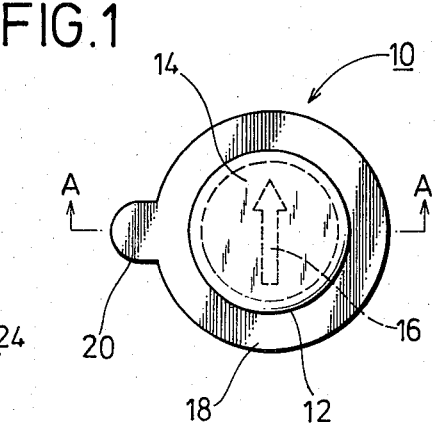
FIGS. 1, 2, and 3 show the front, the right side, and the back, respectively, of the liquid-level indicating window, with magnification.
Figure 2:
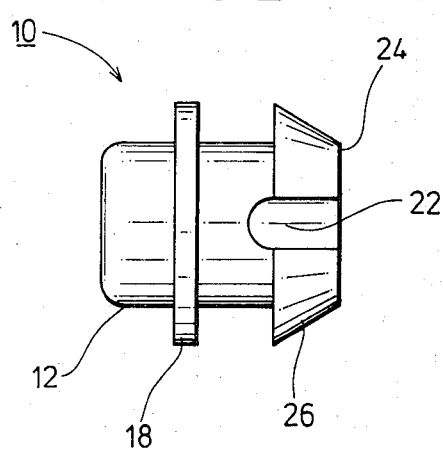
Figure 3:
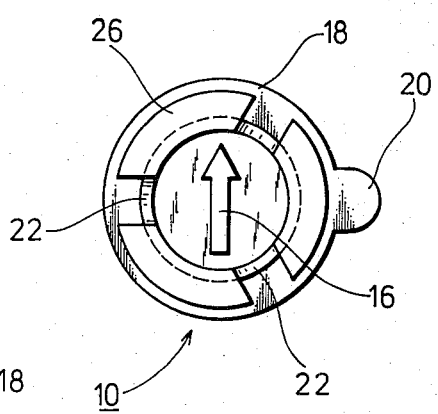
Figure 4:
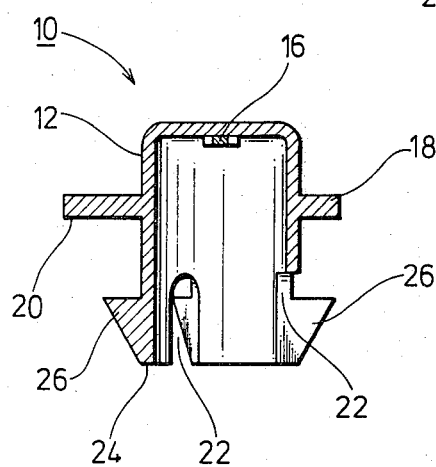
FIG. 4 is a cross sectional view taken along line A—A of FIG. 1.

FIGS. 1, 2, and 3 show the front, right side, and rear views, respectively, of the liquid-level indicating window 10 used to indicate the oil level in the master cylinder for two-wheel vehicles. In FIG. 1, the window proper 12 has a thick-wall short cylindrical form, extending vertically to the plane of the drawing paper, and has its front end plane covered with a transparent synthetic resin, such as 6-Nylon which possesses a high transparency, to form the front window 14. On the inside wall of the front window 14 is provided an arrow signal 16, made as a projection directed upwardly. The flange 18 is provided around the window proper 12 at a location extended from the front plane of the window proper 12, and is about 8 mm in diameter. The flange 18 has a projection 20 at its left end portion. An O-ring 21 is disposed between the flange 18 and the rear section of the window proper 12. The surfaces in contact with the O-ring 21 are provided with a fine finish. Three slits 22 are disposed axially and forward from the rear end section of the window proper 12. Each of the tongue-like pieces 24 located between the slits 22 has a frusto conically shaped attachment or catch 26 associated therewith which is made by forming the outside of the tongue-like piece 24 in the form of a taper which is gradually enlarged toward the window proper 12. On the wall 30 of the reservoir tank which is to be equipped with the liquid-level indicating window 10, a hole 34 is bored, said hole having a stepped section 32 with its outside part enlarged. At a part of the outer surface of the enlarged hole section the dent 36 is formed so as to be fit to the projection 20 formed on the flange 18 of the liquid-level indicating window 10.

In order to put the liquid-level indicating window 10 on the reservoir tank 28, the O-ring 21 is first set on the stepped section 32 within the hole 34 and then the liquid-level indicating window 10 is inserted from the side of the catch 26 into the hole 34. In this step the catch 26 is pressed toward the center because of the presence of the slits 22, and allowed to go through the hole 32. After catch 26 has been pushed through the hole 32 it is allowed to expand on the other side of the wall 30 so that the catch 26 engages the inside of the wall 30. At the same time, the flange 18 not only presses the front side of the O-ring slightly but also is made to fit to the enlarged-diameter hole section on the front side of the hole 34. The projection 20 of the liquid-level indicating window 10 is caught by the dent 36 around the hole 34, thus fixing the liquid-level indicating window 10 at a certain constant angle of attachment. The front window 14 extend outside from the liquid container.

The following is an example of position for attaching the liquid-level indicating window 10 for the reservoir tank 28 of a 2-wheel vehicle, unified with the master cylinder. On the right side of a box shaped reservoir tank 28 for a 2-wheel vehicle, the attaching dent 38 is formed which is used to attach the reservoir tank to the handle of the 2-wheel vehicle. The liquid-level indicating window 10 is attached to the side wall of the reservoir tank 28 near the left end of the attaching dent 38. This position is also close to the projection for the mirror boss 40 to which the back mirror (not shown) is attached. In such a position the liquid-level indicating window is hardly susceptible to disturbance due to external force since it is protected by both the back mirror attached to the mirror boss and the handle pipe fixed at the attaching dent 38.

Another example of an application of the liquid level may be mentioned in which the front window of the liquid-level indicating window is formed in the form of semisphere, thereby facilitating visual inspections from side directions slightly deviating from the vertical direction as well as in a direction vertical to the master cylinder. It is also possible to make the arrow sign or liquid-level indicating line only on the side within the window proper 12.

Another example of an application of the liquid level may also be mentioned in which the projection of the liquid-level indicating window can be eliminated by the use of a swivel setting which brings the body projection of the reservoir tank 28 into a plane contact with the projection of the liquid-level indicating window. In addition, for the attachment of the liquid-level indicating window other methods other than the above-mentioned catch 26 may be adopted, such as the use of springs, screws, or E rings. Combinations of two or more methods is also possible. In addition to 6-Nylon as the material for the liquid-level indicating window, other available materials include glass, vinyl chloride resin, styrene resin, anti-impact ABS resin, and so on.

In the liquid-level indicating window of the present invention, the light coming from outside the reservoir tank through the liquid-level indicating window is allowed to pass through the arrow sign 16 which is almost the same refractive index as the brake fluid which is utilized. Thus, when the tank is full of brake fluid, there is very little light refraction at the boundary plane between the front window and the arrow sign, making the arrow sign 16 invisible. Since the front window extends from the wall of the reservoir tank, the condition when the projected part is full of brake fluid is known from the color of the brake fluid. When the level of the brake fluid is below a prescribed level, i.e., below the arrow-sign level on the front window, the light is caused to reflect on the arrow sign considerably different from the air inside the reservoir tank due to a difference in refractive index, causing the arrow to exhibit a visible distinction. Moreover, since the front window projects from the outside plane of the liquid container, a lot of light entering the front window is caused to reflect with the sign part which is made to emit intense light. This arrow sign will point to the lower level mark indicated on the reservoir tank surface. It is possible to set the arrow sign in the upward direction. In this case, visual inspection is easy to be made since the liquid does not remain on the arrow sign. The section of arrow sign 16, required to be different from the other parts of the front window in thickness of light transmission, may be formed by applying various kinds of forming methods such as negative graving, adhesion, embossing, and thickening. For characters, figures, or signs, sharp refraction is obtainable by letting component planes cross at an acute angle with each other rather than by forming them with smooth curved planes. It is also possible to color the arrow sign the same as the brake fluid. To fix the liquid-level indicating window on the liquid container, various conventional methods are applicable which resort to the uses of pins, screws, clips, etc.

As described above, according to the present invention, the difference in refractive index between air and liquid enables us to know the liquid level within a liquid container, without uncovering the container, by means of visual observation of a small figure of high luminosity and distinction appearing on the front window projecting from the liquid container. A liquid-level indicating window of small size and low cost gives us definite information on whether the liquid container is filled with liquid or empty. The product is also easy to set on the liquid container. For example, it may be attached to a place which is safe from disturbance but very difficult to position, e.g., the handle on the side facing the driver on the master cylinder for a 2-wheel vehicle.

The present invention has been described in detail with the aid of some suitable applications. The present invention is, of course, not limited to these example applications but is also applicable to a lot of modifications within the spirit and scope of the present invention.

I claim:

1. A liquid-level indicating device adapted to be mounted substantially horizontally in an aperture provided in the wall of a liquid container which comprises;
    a liquid level body,
    a liquid-level indicating window provided at one end of said liquid level body for projection from the wall of the liquid container a sufficient distance to provide maximum exposure to light from the front and side directions, compressible attachment means containing an enlarged end portion provided at the other end of said liquid level body, said enlarged end portion being compressed for insertion through the wall aperture and expanded for pressure engagement with the inside wall of the container,
    mounting flange disposed on the body of the indicating device for engagement with the wall of the container at said aperture, said mounting flange cooperating with said compressible attachment means to effect said mounting in said aperture, and
    a liquid level sign portion disposed on said liquid-level indicating window said liquid level sign portion having a refractive index substantially the same as that of the liquid disposed in the liquid container and having a different light refractive index than the remaining portion of said liquid-level indicating window, whereby changes in the liquid level in the container can be visually observed from outside of the container.

2. The liquid-level indicating device of claim 1 having a thick-wall cylindrical shape.

3. The liquid-level indicating device of claim 1 wherein the liquid-level indicating window is made of a material selected from the group consisting of glass, 6-Nylon, vinyl chloride resin, styrene resin, and anti-impact acrylonitrile-butadiene-styrene resin.

4. The liquid-level indicating device of claim 1 wherein the mounting flange is disposed between the liquid level indicating window and the attachment means and extends from the body of the liquid level device.

5. The liquid-level indicating device of claim 4 wherein the attachment means comprises a catch means having a biased frusto conical shape which extends away from the liquid level body, with the enlarged portion thereof facing toward the liquid level indicating window, said catch means containing a plurality of slits which enables the catch means to be compressed against the body of the liquid level device against said bais for mounting to the wall of a container.

6. The liquid-level indicating device of claim 4 wherein the mounting flange contains a projecting means which extends therefrom, said projecting means being adapted to engage the container for holding the sign portion of the liquid level window in position.

7. A liquid-level indicating device mounted in an aperture provided in the side wall of a container which is adpated to house a liquid therein which comprises
a liquid level body,
a liquid-level indicating window provided at one end of said liquid level body,
compressible attachment means containing an enlarged end portion provided at the other end of said liquid level body, said enlarged end portion being compressed for insertion through the wall aperture and expanded for pressure engagement with the side wall of the container, and
a mounting flange disposed on said body of the indicating device between said indicating window and said attachment means, said mounting flange extending from said body,
wherein the aperture in said wall of the container contains a stepped portion for receiving said mounting flange, and said mounting flange is held in said second aperture by said attachment means, whereby the window projects substantially horizontally from the side wall of the container a sufficient distance to provide maximum exposure to light from the front and side direction.

8. The liquid-level indicating device of claim 7 wherein an O-ring is positioned on the stepped portion of the aperture and the mounting flange is held tightly against the O-ring at the outside portion of an container wall by said attachment means which is secured to the inside surface of the container wall.

9. The liquid-level indicating device of claim 8 wherein the attachment means is a catch means having a frusto conical shape with the base portion thereof engaging said inside surface of the container wall, said catch means being compressible for insertion through said stepped aperture and expandable for engagement with the inside surface of the container wall.

10. The liquid-level indicating device of claim 7 wherein the liquid level indicating window contains a sign portion, said sign portion having a different light refractive index than the remaining portion of said liquid level indicating window, whereby changes in the liquid level in the container can be visually observed from outside of the container.

11. The liquid-level indicating device of claim 7 wherein the container is a reservoir for a master cylinder of a two-wheeled vehicle.

12. The liquid-level indicating device of claim 7 wherein the container includes a dent and the mounting flange contains a projecting means which extends therefrom, said projecting means being adapted to engage said dent for holding the sign portion of the liquid level window in position.

* * * * *